Patented July 5, 1927.

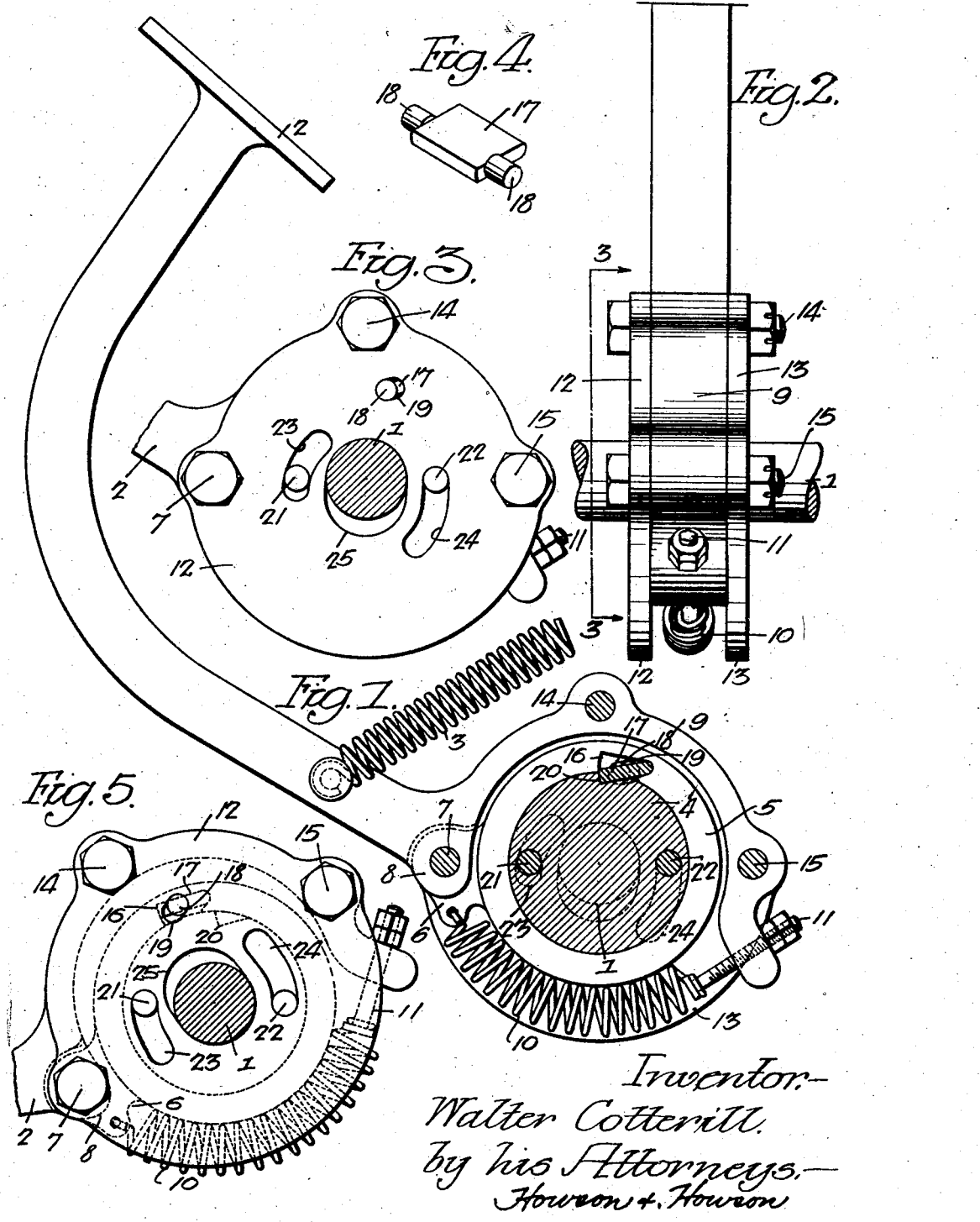

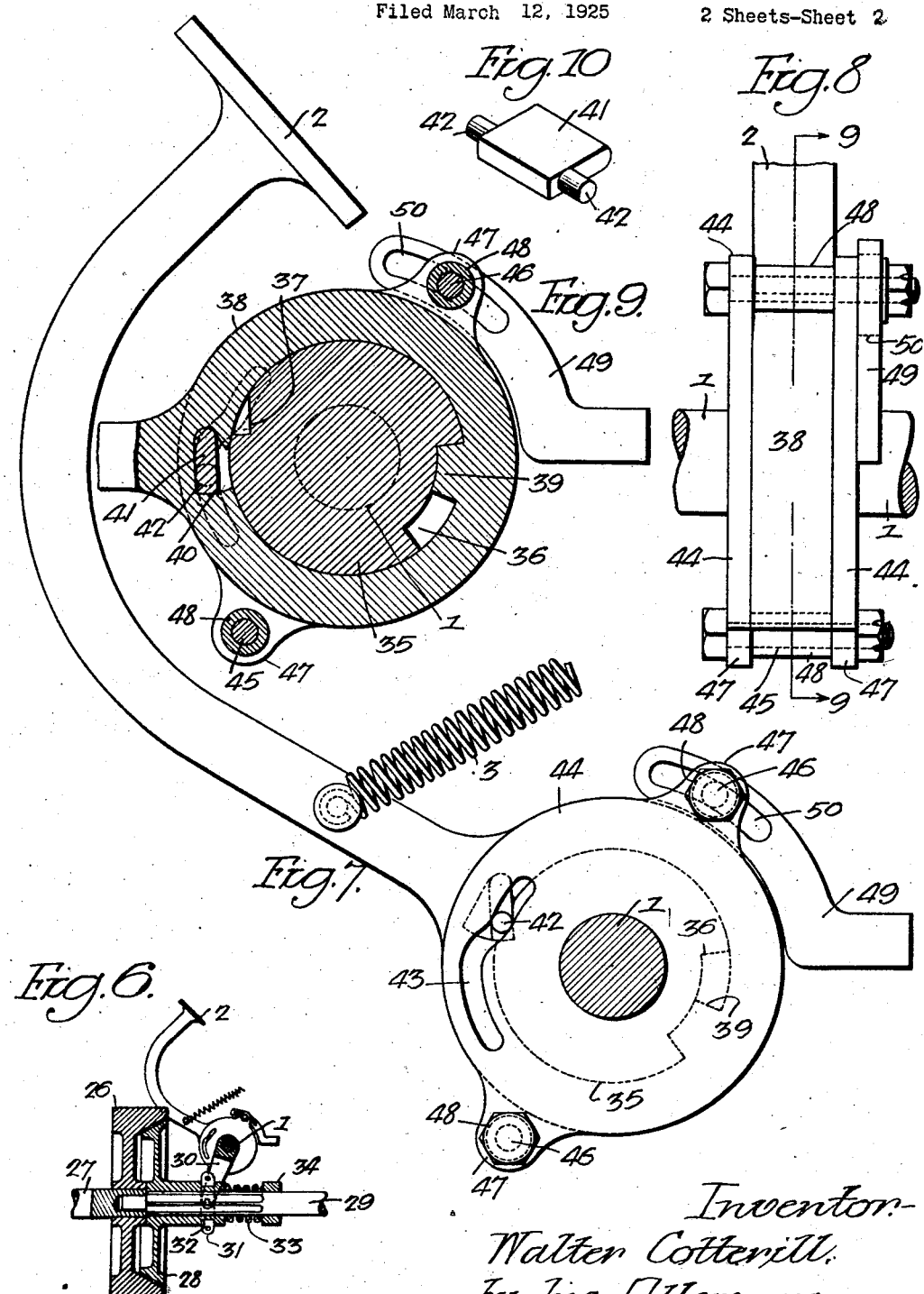

1,634,983

UNITED STATES PATENT OFFICE.

WALTER COTTERILL, OF PHILADELPHIA, PENNSYLVANIA.

CLUTCH-CONTROL DEVICE.

Application filed May 12, 1925. Serial No. 29,780.

The principal object of this invention is to provide novel means for facilitating the shifting of gears forming a part of the transmission of motor vehicles and the like.

A more specific object of the invention is to provide means for automatically and momentarily re-engaging the clutch after the initial disengagement whereby the gear-shifting operation which follows a final disengagement of the clutch will be materially facilitated.

The invention further resides in the structural details of the novel mechanism provided for the above stated purposes.

A device made in accordance with my invention is illustrated in the attached drawings, in which:

Figure 1 is a sectional view transversely of the clutch shaft showing the clutch pedal in elevation and the mechanism interconnecting the pedal with the shaft;

Fig. 2 is a rear elevation of the parts illustrated in Fig. 1;

Fig. 3 is a section on the line 3—3, Fig. 2;

Fig. 4 is a view in perspective of a pawl constituting an element of the device;

Fig. 5 is a view similar to Fig. 3 but showing the parts in the relative positions assumed after the initial disengagement and the consequent re-engagement of the clutch;

Fig. 6 is a reduced more or less diagrammatic view illustrating the device applied to a common form of clutch, the latter being shown in section;

Fig. 7 is a side elevation of a modification of the device within the scope of the invention;

Fig. 8 is a rear elevation of the device shown in Fig. 7;

Fig. 9 is a section on the line 9—9, Fig. 8, and

Fig. 10 is a view in perspective of the pawl used in the modified form of the device.

In shifting the gears of motor vehicles, it has been found of material assistance, particularly with multiple disk clutches, to momentarily re-engage the clutch following an initial disengagement sufficient to permit a movement of the gear shift lever to the neutral position. In this procedure, the operator of the vehicle in shifting gears disengages the clutch sufficiently, as previously stated, to permit disengaging the gears and to advance the gear-shifting lever to the neutral position. Immediately following this disengagement of the gears, the clutch is permitted to reengage, and the final shift of the gears into mesh follows a second and final disengagement of the clutch.

In my present invention, I have provided a mechanical device for automatically effecting the momentary re-engagement of the clutch with a normal straight through movement of the clutch pedal.

With reference to the drawings, 1 indicates a shaft to which the movable clutch element or elements is operatively connected, and 2 the pedal ordinarily fixed to the clutch shaft and providing means whereby the operator may operate the shaft to release the clutch. A spring 3 connected in the present instance to the treadle 2 and to a relatively fixed part of the motor car (not shown) constitutes a means for supporting the pedal 2 in a normal elevated position assumed while the clutch is engaged, and the clutch, as is customary, will include springs which normally retain the clutch elements in engagement.

In Fig. 6, I have illustrated a simple form of clutch to which the device is applied. This clutch comprises a relatively fixed member 26 carried by a shaft 27 and adapted to be engaged by the relatively movable cone-shaped element 28. This latter is splined to a shaft 29 in alignment with but independent of the shaft 27, and the movement of the element 28 axially of the shaft 29 into and out of engagement with the member 26 is controlled by the operator through the pedal 2. In the present instance, the shaft 1 is provided with an arm 30 suitably connected to a collar 31 which seats in an annular recess 32 in the hub of the element 28, and counterclockwise rotation of the shaft 1 through the pedal 2 accordingly results in an axial movement of the element 28 on the shaft 29 against the tension of a spring 33 confined between the end of the hub portion of the element 28 and a fixed collar 34.

The shaft 1 is provided in the present instance with a section 4 of increased diameter, and surrounding this enlarged portion 4 I provide a sleeve 5 which is free to move circumferentially of the shaft within predetermined limits, as hereinafter described. The sleeve 5 includes a lug or ear 6 projecting from the periphery, and to this lug or ear is pivotally secured, by means of a bolt 7, the pedal 2, the latter being provided with two spaced lugs 8, between which the said lug 6 fits, as indicated in Fig. 1. The pedal 2 is also provided, as clearly shown in Fig. 1, with a semi-circular extension 9 passing around the sleeve 5 and having its outer end connected by a spring 10 to the lug 6 on the said sleeve, the spring being secured to the treadle extension 9 in the present instance by means of a bolt 11 whereby the tension of the spring may be adjusted.

The device further comprises a pair of side plates 12 and 13 which are secured by the bolt 7 and bolts 14 and 15 to the opposite sides of the extension 9 of the pedal whereby they lie one on each side of and constitute a housing for the enlargement 4 of the shaft 1 and the sleeve 5.

As shown in Fig. 1, the sleeve 5 is provided with a recess 16 which holds a pawl 17 of a form clearly shown in Fig. 4, this pawl being provided with trunnions 18, 18, one on each side, which in assembly are journaled in slots 19 in the side plates 12 and 13. Also as shown in Fig. 1, the part 4 of the shaft is provided in its periphery with a groove 20 adapted to be engaged by the pawl 17, thereby locking the sleeve 5 to the shaft. Additional means for connecting the treadle with the shaft 1 consists of pins 21 and 22 which project from the opposite faces of the enlarged portion 4 of the shaft and through slots 23 and 24 in the side plates 12 and 13.

As shown in Fig. 3, the aperture 25 in the plates 12 and 13 through which the shaft 1 projects is in the form of a slot, thereby providing for relative movement between the said side plates and the shaft, and the longitudinal axis of this slot 25 is preferably coincident with an arc drawn with the axis of the bolt 7 as a center. The lower end of the slot 23 and the upper end of the slot 24, see Fig. 3, are also preferably formed with their longitudinal center lines on an arc whose center is the longitudinal axis of the bolt 7, and these portions of each of the slots 23 and 24 may correspond in length substantially to the difference between the total length of the slot 25 and the diameter of the shaft 1. The remainder of the slots 23 and 24 are formed with their center lines concentric with the shaft 1 when the shaft occupies the lower end of the slot 25, as shown in Fig. 5.

The operation of the device is as follows: An initial pressure upon the pedal 2 will effect rotation of the sleeve 5 and of the shaft 1, through the pawl 17 engaging the recess 20, as shown in Fig. 1. Rotation of the shaft results in a disengagement of the clutch and a partial compression of the spring 33 which tends to hold the clutch in engagement. Compression of the clutch spring increases the pressure opposing rotation of the shaft 1 through the pedal, and when this back pressure reaches a predetermined amount, there is a tendency for the pedal 2 to pivot or turn around the pivot bolt 7. As a result of this movement of the pedal, the pawl 17 is withdrawn from the recess 20, this being effected through the movement of the side plates 12 and 13 with the pedal in its oscillation about the pivot bolt 7 and the consequent elevation of the pawl through the trunnions 18, 18, which are lodged in the recesses 19 in the said side plates. The slots 19 provide for the relative movement between the side plates and the trunnions 18 of the pawl.

Withdrawal of the pawl from the recess 20 releases the shaft 1 and permits the clutch spring 33 to re-engage the clutch, and this reverse movement of the shaft also carries the pins 21 and 22 into or near the ends of the slots 23 and 24, as shown in Fig. 5. A continued pressure on the pedal accordingly results through the side plates and the pins 21 and 22 in a further movement of the shaft in a counterclockwise direction, see Fig. 1, and a consequent second release of the clutch.

In operating the device, the operator so times the movement of the gear shift lever that the latter is moved into the neutral position immediately following or coincident with the initial release of the clutch, the lever being held in neutral until the final release of the clutch, when it is shifted further to complete the change of gears.

It will be noted that the slot 25 and those ends of the slots 23 and 24 normally occupied by the pins 21 and 22 are so formed as to provide for the movement of the pedal 2 and the side plates 12 and 13, which move with the pedal, around the bolt 7 as an axis. Also the spring 10 which tends to retain the pedal 2 in the normal relative position, as shown in Fig. 1, with respect to the shaft and the sleeve, may be adjusted to provide for a release of the pawl 17 from the recess 20 at the proper moment following the initial disengagement of the clutch. The spring 3 insures a normal retention of the pedal lever 2 in the elevated normal position.

It will be apparent that there may be very material modifications in the details of this device without departure from the essential features of the invention, and one such modification I have illustrated in Figs. 7 to 10, inclusive. In this instance, the shaft 1 is provided with an enlarged substantially cylindrical portion 35 having in one side an elongated peripheral recess 36 and at the opposite side a substantially V-shaped recess 37. The enlarged part 35 of the shaft is surrounded by a sleeve 38, to which is attached the pedal 2, the pedal and the sleeve being formed integrally in the present instance. The sleeve 38 has an inwardly projecting lug 39 which occupies the recess 36, the dimensions of the lug 39 providing for a relative movement between the sleeve and the shaft 1. The sleeve 38 also has a recess 40 in its inner face adapted for reception of a pawl 41 adapted to engage the recess 37 in the enlargement 35 of the shaft to thereby operatively connect these parts together for the initial rotative movement of the shaft through the pedal 2.

The pawl 41 is provided with trunnions 42, 42, which extend through cam slots 43 and side plates 44, 44, the latter being secured one on each side of the enlargement 35 through the medium of bolts 45 and 46 which extend through bosses 47, 47, on the said sleeves. Spacer sleeves 48 are provided between the plates 44, 44, to prevent the latter clamping too tightly against the faces of the enlargement 35 and the sleeve 38. The plates 44 are prevented from rotating in the present instance by a fixed member 49, to which the said plates are secured by means of the bolt 46, which latter extends through a slot 50 in the member 49, as clearly illustrated. The slot 50 provides for an angular adjustment of the plates 44 with respect to the other elements whereby the position of the plates 44 may be varied and the point of release of the pawl 41 in the advance movement of the lever thereby adjusted as desired.

Assuming the parts to be in the positions shown in Fig. 7, it will be apparent that pressure on the pedal 2 will effect through the pawl 41 a counterclockwise angular movement of the shaft 1. This movement of the shaft will continue until the trunnions 42 of the pawl 41 ride up into the outwardly extending portions of the cam slots 43, which has the effect of retracting the pawl 41 from the recess 37 and permitting the reverse rotation of the shaft 1 as the clutch spring acts to re-engage the clutch elements. Reverse movement of the shaft 1, however, brings the lug 39 of the sleeve 38 into the forward end of the recess 36, as shown in Fig. 9, whereby the continued downward movement of the pedal 2 results in a continuance of the counterclockwise rotation of the shaft 1 and the further and final disengagement of the clutch parts. Release of the pedal 2 by the foot of the operator results in a return of the parts to the initial relative positions, as shown in Fig. 7.

It will be noted that in this form of my device the retraction of the pawl 41 is a positive one resulting from the interaction of the trunnions 42 of the pawl and the cam slots 43.

I claim:

1. The combination with a rock shaft, of resilient means opposing rotation of the shaft in one direction, a lever journaled on the shaft and having an operative connection with the shaft whereby the shaft may be rotated in opposition to said resilient means, and mechanism automatically operative in the normal movement of said lever to rotate the shaft to momentarily release the shaft from the lever following a predetermined movement of the shaft.

2. The combination with a rock shaft, of resilient means opposing rotation of the shaft in one direction, a lever journaled on the shaft and having an operative connection with the shaft whereby the latter may be moved in opposition to said resilient means, means automatically operative in the normal movement of the lever to rotate the shaft to temporarily release the shaft from the lever, and resilient means for returning the lever to a normal retracted position.

3. The combination with a rock shaft, of resilient means opposing rotation of the shaft in one direction, a lever journaled on the shaft and normally resiliently retained in a retracted position, a pawl operatively connecting the lever with the shaft, secondary interengaging elements on the shaft and lever providing an operative connection therebetween with lost motion, and means for automatically disengaging the pawl following a predetermined advance movement of the lever whereby the aforesaid lost motion permits return of the shaft to the normal position by said resilient means and consequent operative reengagement of the shaft with the lever through said secondary connection.

4. The combination with a rock shaft, of resilient means opposing rotation of the shaft in one direction, a lever journaled on the shaft, a pawl carried by the lever and operatively engaging the shaft whereby the shaft is movable with the lever in opposition to said resilient means, relatively fixed cam means for releasing the pawl following a predetermined forward movement of the lever, independent means for operatively reengaging the shaft and the lever following a reverse return movement of the shaft by said resilient means, and resilient means for returning the lever to the normal retracted position.

5. The combination with a rock shaft, of resilient means opposing rotation of the shaft in one direction, a lever journaled on the shaft, a pawl carried by the lever and engaging the shaft whereby the shaft may be rotated through the lever in opposition to said resilient means, relatively fixed plates at opposite sides of said lever, said plates having cam slots, trunnions on said pawl extending into said cam slots, the slots being so arranged that the pawl is released from the shaft following a predetermined forward movement of the lever from the normal retracted position, secondary means for operatively connecting the lever with the shaft effective following release of said pawl and return of the shaft to the normal position by said resilient means, and resilient means tending to retain the lever in the normal retracted position.

6. The combination with a rock shaft, of resilient means opposing rotation of the shaft in one direction, a lever journaled on the shaft, a pawl carried by the lever and adapted to engage the shaft whereby the shaft may be rotated through the lever, resilient means tending to retain the lever in a normally retracted position, adjustable means for releasing the pawl from the shaft following a predetermined forward movement of the lever from said normal retracted position, and secondary means for operatively connecting the lever with the shaft effective following release of said pawl and return of the shaft to the normal position by the resilient means connected therewith.

7. The combination with a rock shaft, of resilient means opposing rotation of the shaft in one direction, a lever journaled on the shaft, a pawl carried by the lever and adapted to operatively engage the shaft whereby the shaft may be rotated through the lever, resilient means tending to retain the lever in a normal retracted position, a relatively fixed element having a cam slot located adjacent the side of said lever, a trunnion on the pawl adapted to extend into said cam slot, said slot having parts extending circumferentially of the shaft but with different radii whereby after a predetermined forward movement of the lever from the normal retracted position the pawl is automatically released from the shaft to permit the shaft to return to its normal position, means for adjusting the slotted member circumferentially of the shaft whereby the point of release of said pawl with respect to the normal position of the parts may be varied, and secondary means for operatively connecting the shaft with the lever effective following release of the pawl and return of the shaft to the normal position whereby continued forward movement of the lever results in a second rotation of the shaft in opposition to its resilient retaining means.

8. The combination with a rock shaft, of resilient means opposing rotation of the shaft in one direction, a lever for rotating the shaft in the opposite direction, mechanism connecting the lever and shaft including means for momentarily releasing and thereafter reconnecting the shaft from and with the lever following a predetermined movement of the shaft in opposition to said resilient means, and adjustment means whereby the said predetermined movement of the shaft preceding the momentary release may be varied.

9. The combination with a clutch including resilient means tending to retain the clutch elements in engagement, of means for disengaging the clutch elements including an operating member, automatic means for momentarily disengaging the clutch from the operating member during a continuous declutching movement of the latter, and adjustment means whereby the momentary disengagement may be made to occur at a preferred point in the said continuous declutching movement of the operating member.

WALTER COTTERILL.